United States Patent [19]
Kirby

[11] Patent Number: 5,226,436
[45] Date of Patent: Jul. 13, 1993

[54] WHEEL POSITION SENSOR FOR CAR WASH CAR SIZING

[75] Inventor: Benjamin L. Kirby, Ankeny, Iowa

[73] Assignee: Ryko Manufacturing Co., Grimes, Iowa

[21] Appl. No.: 891,223

[22] Filed: May 29, 1992

[51] Int. Cl.⁵ .............................................. B08B 3/02
[52] U.S. Cl. ....................... 134/57 R; 134/123; 134/172; 134/181; 134/45; 200/86 R
[58] Field of Search .............. 134/56 R, 45, 123, 172, 134/181; 15/53.1, 53.2, 53.3, 53.4; 200/85 A, 85 R, 86 R, DIG. 35

[56] References Cited

U.S. PATENT DOCUMENTS

| | | | |
|---|---|---|---|
| 1,317,020 | 9/1919 | Kempien | 200/86 R |
| 1,368,798 | 2/1921 | Henry | 200/86 R X |
| 1,487,771 | 3/1924 | Weaver | 200/86 R |
| 1,803,290 | 4/1931 | Adler, Jr. | 200/86 R |
| 2,978,719 | 4/1961 | Vani et al. | 15/53.4 |
| 3,167,797 | 2/1965 | Hergonson | 15/3 |
| 3,299,901 | 1/1967 | Axe et al. | 134/123 |
| 3,421,526 | 1/1969 | Alkire et al. | 134/109 |
| 3,422,827 | 1/1969 | McCulloch | 134/123 |
| 3,474,801 | 10/1969 | Stotts | 134/123 |
| 3,498,302 | 3/1970 | Null | 134/45 |
| 3,509,527 | 4/1970 | Oakes et al. | 200/86 R |
| 3,529,611 | 9/1970 | Daum et al. | 134/112 |
| 3,533,422 | 10/1970 | Alimanestiano | 134/45 |
| 3,543,774 | 12/1970 | Trasp | 134/57 |
| 3,587,807 | 6/1971 | Hickman | 134/45 X |
| 3,593,726 | 7/1971 | Lockhart | 134/45 |
| 3,596,241 | 7/1971 | Migneault | 134/45 |
| 3,604,434 | 9/1971 | Hurst | 134/58 |
| 3,667,486 | 6/1972 | Cole et al. | 134/45 |
| 3,736,948 | 6/1973 | Crosswhite | 134/95 |
| 3,844,480 | 10/1974 | Taylor et al. | 239/186 |
| 4,178,948 | 12/1979 | Swinehart | 134/45 |
| 4,933,016 | 6/1990 | Carlson | 134/18 |
| 5,033,490 | 7/1991 | Wade et al. | 134/123 |
| 5,125,981 | 6/1992 | Belanger et al. | 134/123 |

Primary Examiner—Frankie L. Stinson
Attorney, Agent, or Firm—Zarley, Mckee, Thomte, Voorhees & Sease

[57] ABSTRACT

Wheel sensor treadleplates are provided in both wheel tracks of a car wash and the outermost depressed treadleplates send signals to a programmable controller which moves the spray head to a predetermined spacing from the vehicle side for optimum washing and safety as the spray head moves along both sides of the vehicle.

20 Claims, 3 Drawing Sheets

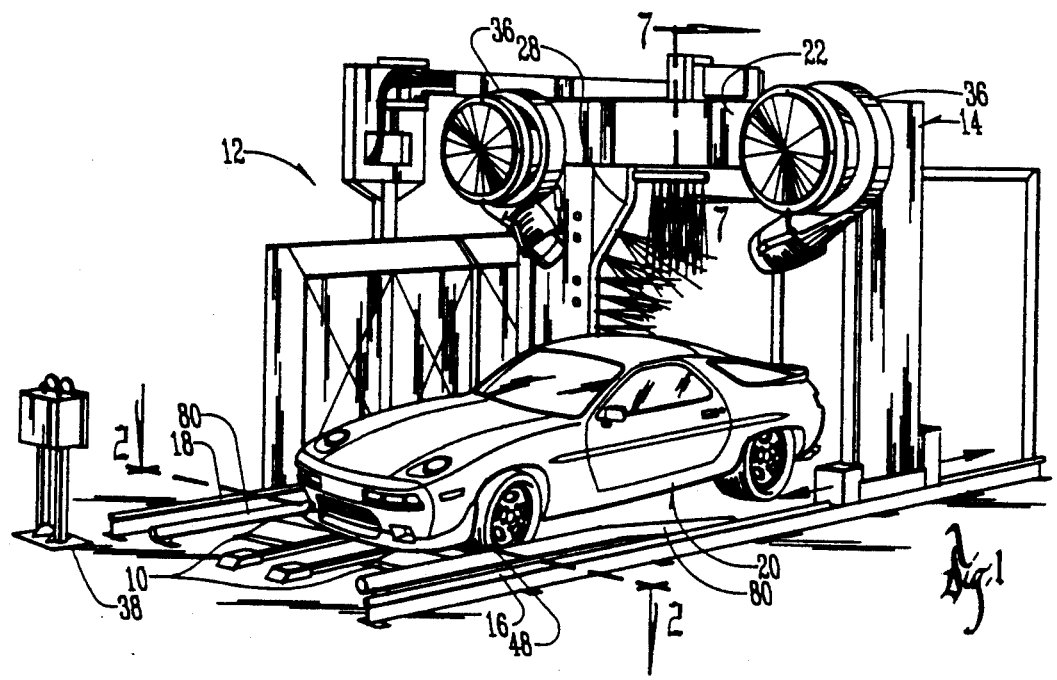
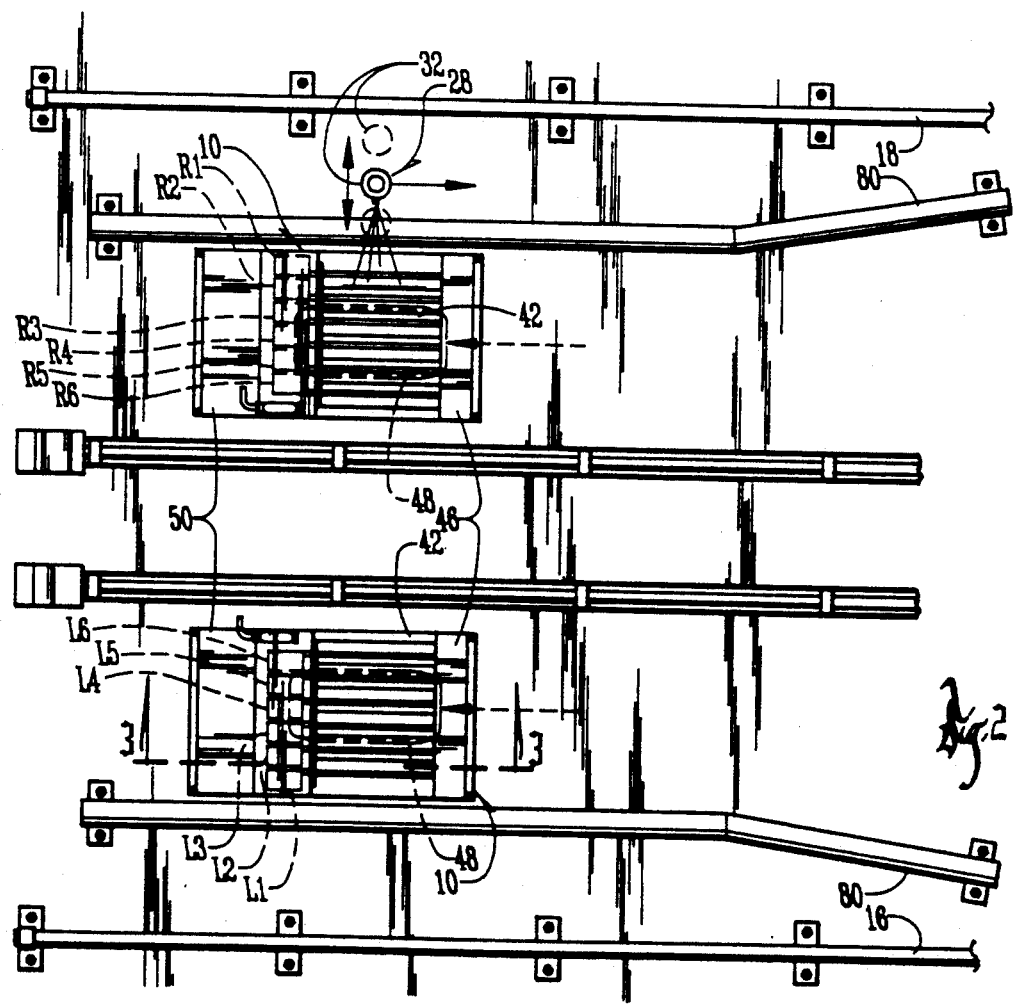

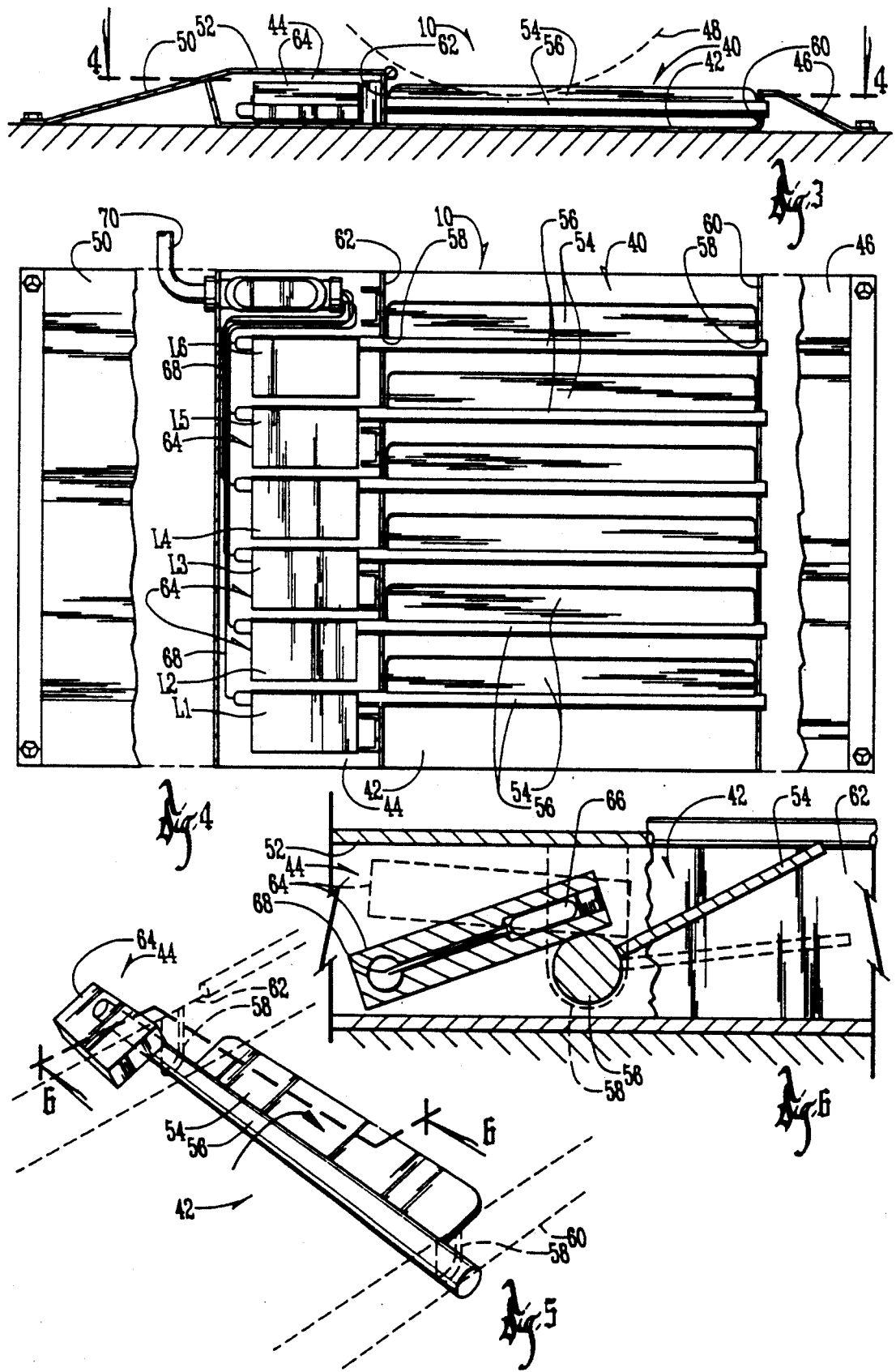

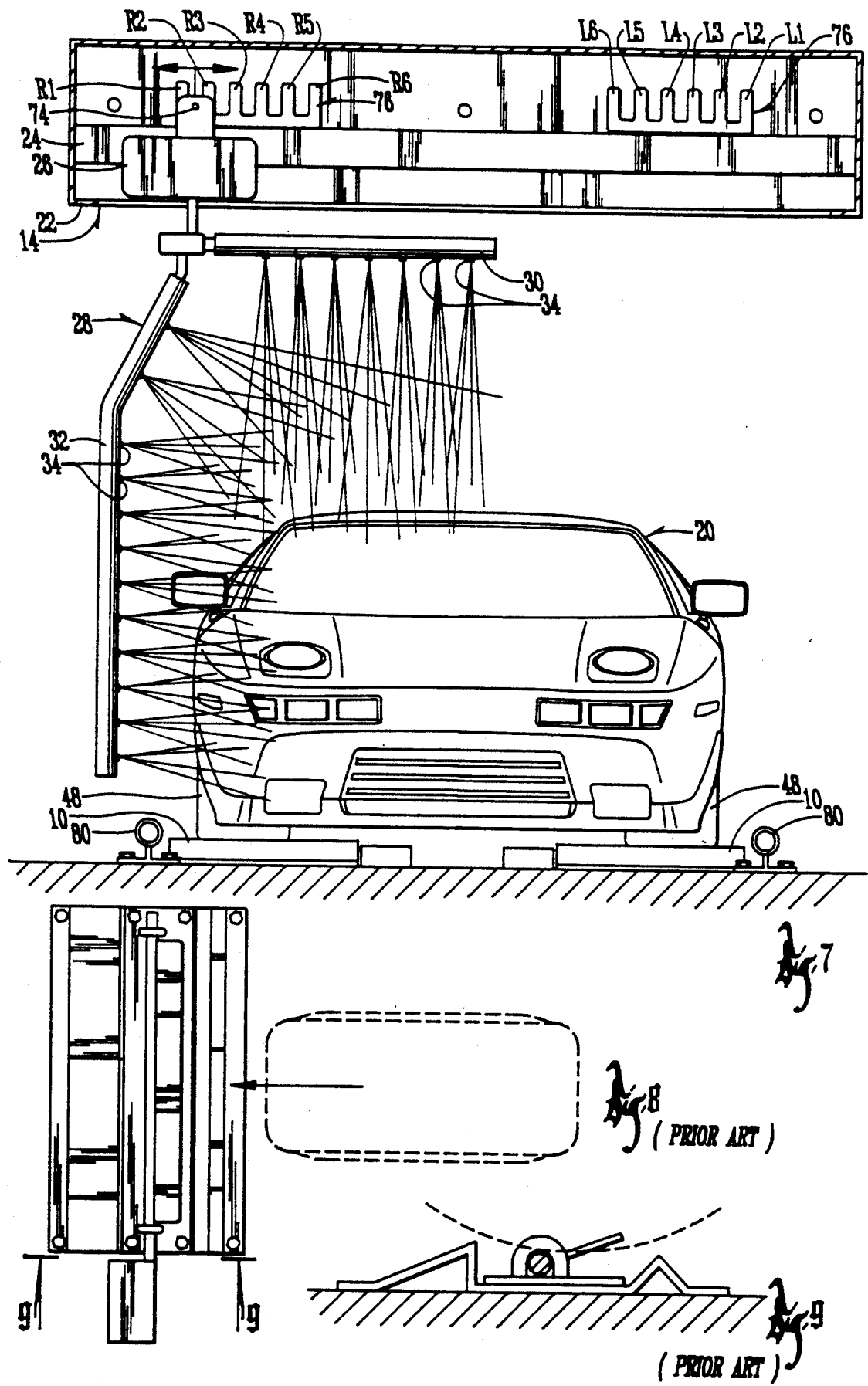

WHEEL POSITION SENSOR FOR CAR WASH CAR SIZING

BACKGROUND OF THE INVENTION

It is important in an automatic car wash that the control system have accurate information as to not only the width of the car but the precise location of the car sides such that uniform spacing between the spray head and the car sides can be maintained. A typical preferred spacing is approximately 14 inches. This will provide the most effective washing action and maintain clearance for side mounted accessories such as mirrors.

The most common prior art wash system does not attempt to determine the width of vehicles or to maintain uniform spacing between a treatment device and the sides of vehicles. Most prior art spray wash equipment washes vehicle sides with the spray nozzles at the same width for every vehicle. This nozzle position is usually wide enough to clear the widest vehicle expected. This approach leads to lower wash quality because the nozzles are too far away from medium and small vehicles.

Some wash systems used sensors that physically contacted the sides of vehicles. An example is a plastic rod attached to a mechanical limit switch. The rod would touch the vehicle, activating the switch. This could damage painted surfaces or get caught in mirrors or antennae or other parts.

Some other systems used photoelectric sensors, ultrasonic sensors, or other non-contact sensors. Some of these have worked incorrectly because they detected streams of spraying water as being the vehicle surface, or because they did not react consistently to the various angles and protrusions on vehicles. They also sometimes were not accurate or consistent in reading distances. Also, sunlight shining into a photoelectric receiver can sometimes activate the receiver, making it act as though it had received a signal from the photoelectric transmitter. Another problem with many photoelectric sensors, ultrasonic sensors, and other non-contact sensors is that they experience a high failure rate when subjected to large amounts of, or frequent exposure to, water.

The use of wheel sensors having electrical switches is shown in FIGS. 8 and 9. This wheel sensor determines when the vehicle has moved along the track to the desired position for the wash to begin. A treadleplate is depressed against the bias of a counter weight and a switch is closed sending a signal to a control system. The treadleplate extends laterally of the wheel line of travel. Information as to the relative lateral position of the wheel is not possible from this wheel sensor.

A wheel sensor in U.S. Pat. No. 4,178,948 determines the length of time a spray head will operate based on the duration of time the wheel is on the treadleplate which is determined by the width of the treadleplate. No information is provided as to the lateral positioning of the wheel or car side.

Thus, what is needed is a vehicle sizing sensor that will accurately and reliably determine the location of the vehicle sides such that a spray head can move along the sides with a uniform predetermined spacing.

SUMMARY OF THE INVENTION

A wheel sensor assembly is placed in both wheel tracks and includes a series of laterally spaced apart treadleplates which when depressed operate mercury switches connected to a programmable controller which will cause the spray head to be moved to a predetermined distance from the vehicle side. Each treadleplate has a switch but the outermost plate which is depressed by the vehicle wheel is the critical one in determining the location of the wheel and thus the vehicle side.

The spray head is mounted on a trolley movable across the vehicle on a support frame which includes two sets of proximity targets, one for the left side and one for the right side. A proximity switch in response to a signal from the programmable controller will locate the spray head opposite the target corresponding to the same numbered treadleplate thereby assuring reliable and accurate positioning of the spray head relative to the side of the vehicle.

It is understood that the wheel sensor system may be utilized in connection with any vehicular treatment process and is not limited to car washing. Other examples would include painting, buffing, drying and washing with brushes.

The length of the longitudinally extending treadleplates is on the order of 20 inches and is such that the driver has adequate time to stop before moving off the plates. A signaling light will come on telling the driver to stop. The prior art transverse treadleplate of FIGS. 5 and 6 would require a barrier since the wheel is on the plate for a very short time allowing minimal time for the driver to stop.

DESCRIPTION OF THE DRAWINGS

FIG. 1 is a perspective view of a car wash utilizing the wheel position sensor of this invention.

FIG. 2 is a top plan view thereof.

FIG. 3 is a cross sectional view of the wheel sensor assembly taken along line 3—3 in FIG. 2.

FIG. 4 is a fragmentary top plan view of the wheel sensor assembly.

FIG. 5 is an enlarged fragmentary perspective view of a single treadleplate.

FIG. 6 is a cross sectional view taken along line 6—6 in FIG. 5.

FIG. 7 is a cross sectional view taken along line 7—7 in FIG. 1 showing the proximity switch and left and right proximity targets.

FIG. 8 is a top plan view of a prior art treadleplate.

FIG. 9 is a cross sectional view taken along line 9—9 in FIG. 8.

DESCRIPTION OF PREFERRED EMBODIMENT

The wheel sensor assembly of this invention is referred to in FIG. 2 by the reference numeral 10 and is included in a car wash 12 illustrated in FIG. 1. The car wash 12 includes an inverted U-shaped support frame 14 movable along rails 16 and 18 extending parallel to and on opposite sides of a vehicle 20.

The frame 14 includes a cross frame member 22 having a rail 24 on which a trolley 26 moves over the vehicle 20. A spray head 28 is carried by the trolley 26 and includes a horizontal arm 30 and a vertical arm 32. Each of the arms 30 and 32 have spaced apart spray nozzles 34. The spray head 28 is movable along both sides of the vehicle and across both ends and is designed to rotate 90° at each corner as required.

It is also seen that dryer fans 36 are carried on the cross frame 22 and an electronic message sign 38 is positioned at the exit of the car wash.

The wheel sensor assembly 10 includes an enclosure 40 having an open chamber 42 and a closed chamber 44. A ramp 46 guides the wheel 48 on to the wheel sensor 10. An exit ramp 50 extends off a ramp cover plate 52 over the closed chamber 44.

Each wheel sensor assembly 10 includes six treadleplates 54 each having pivot shafts 56 mounted in notches 58 in upstanding walls 60 and 62. Counterweights 64 are connected to the pivot shafts 56 and are positioned in the closed chamber 44. Each of the treadleplates 54 are identified individually as L1-L6 or R1-R6.

A mercury switch 66 is positioned inside the counterweight 64 and includes a pair of wires 68 contained in a control cable 70 which extends to a programmable controller (not shown).

The wheel sensor for the left wheel track is shown in FIG. 4 and the wheel sensor for the right wheel track is similar and the individual treadleplates 54 are labeled R1-R6.

The cross frame 22 as seen in FIG. 7 includes a proximity switch 74 carried on the trolley 26 for being positioned opposite targets 76 being labeled in a manner corresponding to the individual treadleplates 54 identified as L1-L6 and R1-R6.

Thus it is seen in operation that the vehicle 20 will drive into the car wash 12 between guardrails 80 until the front wheels are positioned on the left and right wheel sensor assemblies 10. Centering the car between the guardrails 80 is not important as the wheel sensors 10 will locate the car for wash purposes. Several of the treadleplates 54 will be depressed and the signals from each of the mercury switches 66 in the treadleplates will be transmitted to the programmable controller but signals of all but the outermost treadleplates on each side will be ignored. The control in response to these signals will cause the trolley 26 in FIG. 7 to move to a position such that the proximity switch 74 is opposite the appropriate target 76 such that the spacing between the spray head vertical arm 32 is at the optimum distance from the vehicle side as indicated by the solid and dash lines in FIG. 2. A safety feature built into the system requires that the vehicle to be washed have both wheels on the wheel sensors 10 before the wash system will begin operation.

What is claimed is:

1. A car treatment system comprising,
a treatment head means mounted on a frame moveable along the side of a vehicle and towards and away from the vehicle side,
power means for moving said treatment head means,
a wheel sensor means in a vehicle wheel track to determine the lateral position of a vehicle wheel, and
control means responsive to said wheel sensor means for activating said power means to move said treatment head means to a constant predetermined distance away from a vehicle side.

2. The structure of claim 1 wherein said treatment head means is a wash spray head.

3. The structure of claim 1 wherein said wheel sensor means includes a plurality of sensors positioned in side by side relationship across the vehicle wheel track.

4. The structure of claim 3 wherein said wheel sensors are pressure activated by said wheel running over them.

5. The structure of claim 1 and a wheel sensor means is provided in both wheel tracks.

6. A wheel position sensor assembly comprising,
a plurality of treadleplates positioned in side by side relationship for movement between raised and lowered positions,
bias means connected to said treadleplates to normally maintain them in said raised position,
switch means operatively connected to said treadleplates for sending a signal indicating which treadleplates have been moved to said lowered position thereby giving a relative location of a vehicle wheel, and
said base means and treadleplate comprising a counterweight mounted on and positioned on one side of a pivot shaft with said treadleplate being mounted on the opposite side of said pivot shaft.

7. The structure of claim 6 wherein said switch means comprises a mercury switch.

8. The structure of claim 6 wherein the size and number of said treadleplates are such that less than all treadleplates can be activated at the same time by a wheel.

9. The structure of claim 6 wherein said treadleplates are pivotal between said raised and lowered positions about axes parallel to the line of wheel travel.

10. The structure of claim 9 and said sensor assembly is positioned in a ramp enclosure having an open chamber for said treadleplates and a closed chamber for said bias means, and said open and closed chambers being positioned in end to end relationship in the line of wheel travel.

11. A car treatment system comprising,
a treatment head mounted on a frame moveable along the side of a vehicle and towards and away from the vehicle side,
power means for moving said treatment head,
a wheel sensor assembly in a vehicle wheel track to determine the lateral position of a vehicle wheel, said sensor assembly including a plurality of treadleplates positioned in side by side relationship across said wheel track for movement between raised and lowered positions,
bias means connected to said treadleplates to normally maintain them in said raised position,
switch means operatively connected to said treadleplates for sending a signal indicating which treadleplates have been moved to said lowered position thereby giving a relative location of a vehicle wheel, and
control means responsive to said switch signals for activating said power means to move said treatment head to a constant predetermined distance away from a vehicle side.

12. The structure of claim 11 wherein said treatment head is a spray head.

13. The structure of claim 11 wherein said bias means comprises a counter weight.

14. The structure of claim 11 wherein said switch means comprises a mercury switch.

15. The structure of claim 11 wherein the size and number of said treadleplates are such that less than all treadleplates can be activated at the same time by a wheel.

16. The structure of claim 11 wherein said treadleplates are pivotal between said raised and lowered positions about axes parallel to the line of wheel travel.

17. The structure of claim 16 and said sensor assembly is positioned in a ramp enclosure having an open chamber for said treadleplates and a closed chamber for said bias means, and said open and closed chambers being positioned in end to end relationship in the line of wheel travel.

18. The structure of claim 17 wherein said bias means and treadleplate comprise a counterweight mounted on and positioned on one side of a pivot shaft with said treadleplate being mounted on the opposite side of said pivot shaft.

19. The structure of claim 11 and proximity targets are positioned on said frame in a plane transverse to the line of wheel travel and correspond in number and spacing to said treadleplates, a proximity switch operatively mounted on said treatment head, and said control means activates said power means to move said proximity switch to the corresponding target.

20. The structure of claim 11 and a wheel sensor assembly is provided in both wheel tracks.

* * * * *